United States Patent
Kahrger et al.

(10) Patent No.: US 7,191,888 B2
(45) Date of Patent: Mar. 20, 2007

(54) MOVABLE BELT CONVEYOR SYSTEM

(75) Inventors: Rainer Kahrger, Leipzig (DE); Dieter Hoffmann, Leipzig (DE)

(73) Assignee: Man Takraf Fördertechnik GmbH (DE)

( * ) Notice: Subject to any disclaimer, the term of this patent is extended or adjusted under 35 U.S.C. 154(b) by 0 days.

(21) Appl. No.: 11/244,112

(22) Filed: Oct. 5, 2005

(65) Prior Publication Data

US 2007/0039802 A1 Feb. 22, 2007

(30) Foreign Application Priority Data

Aug. 18, 2005 (DE) .................... 10 2005 039 067

(51) Int. Cl.
*B65G 65/02* (2006.01)

(52) U.S. Cl. .............. 198/303; 198/312; 198/314

(58) Field of Classification Search ........... 198/303, 198/312, 314, 508, 585, 586, 588, 594; 414/133
See application file for complete search history.

(56) References Cited

U.S. PATENT DOCUMENTS

| | | | | | |
|---|---|---|---|---|---|
| 1,996,488 | A | * | 4/1935 | Philips | ........... 198/508 |
| 3,286,818 | A | * | 11/1966 | Scott | ............ 198/585 |
| 3,887,061 | A | * | 6/1975 | Hopkins | ........ 198/304 |

(Continued)

FOREIGN PATENT DOCUMENTS

DE  3242769  5/1984

OTHER PUBLICATIONS

Kunze et al., Jan. 2002, 7.3.2 Rückfahrzeug mit Rückkopf, Baumaschinen, Erdbau- und Tagebaumaschinen, 1st edition, p. 369.

(Continued)

*Primary Examiner*—Douglas Hess
(74) *Attorney, Agent, or Firm*—McGlew & Tuttle, PC (57) ABSTRACT

A movable belt conveyor system for a leach pad for use for sulfidic copper ore, where favorable conditions are to be generated for leaching out the copper by a slight compaction of the ore piled up into a dump for the microbiological leaching technology. The movable belt conveyor system of a length of up to several km is composed of a plurality of smaller belt segments, comprising a tail segment (70), standard segments (71$^{1-n}$) and a head segment (72), as well as a traveling tripper (8). To prevent the loading by these individual components from being excessively compacted by the weight of the device during multiple travel over the dump during the moving process, the belt drives with the driving drum are accommodated in the tail element (70), which is supported on the soil next to the leach pad. In addition, the traveling tripper (8) is designed as an independent unit with the belt drums, additional belt drives and the belt-tensioning means, which unit is autarchically displaceable on a caterpillar-type moving gear (85) of its own. Due to the moving of the belt on the caterpillar-type moving gears of the standard segments (71$^{1-n}$), on the head segment (72) and on the traveling tripper (8) as well as due to the absorption of the weight of the tail segment (70) by the transfer carriage (6), the surface pressure acting locally on the dump is reduced and the compaction of the ore on the dump due to being traveled over by the belt conveyor system remains low. Traveling over with a moving device, which frequently happens with the use of a moving caterpillar, is eliminated.

8 Claims, 7 Drawing Sheets

U.S. PATENT DOCUMENTS

| | | | | |
|---|---|---|---|---|
| 4,037,735 | A | * | 7/1977 | Althoff ........................ 414/133 |
| 4,206,840 | A | * | 6/1980 | Hanson ........................ 198/301 |
| 4,319,677 | A | * | 3/1982 | Kipper ........................ 198/585 |
| 4,345,680 | A | * | 8/1982 | Kay ............................ 198/304 |
| 4,406,361 | A | * | 9/1983 | Konigs et al. .............. 198/588 |
| 4,979,781 | A | * | 12/1990 | Bothwell et al. ............. 299/18 |
| 5,090,549 | A | * | 2/1992 | Thiel ........................... 198/312 |
| 6,085,890 | A | * | 7/2000 | Kelly et al. .................. 198/303 |
| 6,782,993 | B2 | * | 8/2004 | Bernard et al. ............. 198/585 |
| 7,108,124 | B2 | * | 9/2006 | Bernard et al. ............. 198/617 |

OTHER PUBLICATIONS

Dynamic Pad Reclaim and Stacking System, Surface Mining, 2001, No. 2, p. 248.

* cited by examiner

MOVABLE BELT CONVEYOR SYSTEM

CROSS REFERENCE TO RELATED APPLICATIONS

This application claims the benefit of priority under 35 U.S.C. § 119 of German Application Number DE 10 2005 039 067.6 filed Aug. 18, 2005, the entire contents of which are incorporated herein by reference.

FIELD OF THE INVENTION

The present invention pertains to a movable belt conveyor system that is especially suitable for use with sulfidic copper ore, where favorable conditions are to be created for leaching out the copper by a slight compaction of the ore piled up in a dump allowing for microbiological leaching technology to act.

BACKGROUND OF THE INVENTION

It is known that movable belt conveyor systems can be used for leaching oxidic copper ores by acid. Compaction by moving the belt conveyor system with moving caterpillars (endless tracks) is less critical here. In general, the conveying system for piling up a leach pad comprises a plurality of feed belts, a movable tipping belt and a stacking system with traveling trippers and a stacker or a tilting bridge.

Depending on the design embodiment of these belt conveyor systems, various moving devices may be provided for use for moving belt conveyor systems. Mainly caterpillar (endless track) tractors or bulldozers with laterally arranged moving heads are used for moving belt conveyor systems with belt-supporting structures standing on ground sleepers, which are connected to one another by one or two moving rails.

Such a belt-moving device, which comprises a caterpillar tractor as the basic device, on which a side boom with a roller head is arranged as a moving means, is known from the technical book *Baumaschinen; Erdbau-und Tagebaumaschinen* [Building Machinery; Earth-moving Machinery and Open Cast Mining Machinery], Verlag Vieweg, 1 st edition, 2002, page 369, Section 7.3.2 "Rückfahrzeug mit Rückkopf" [Moving Vehicle with Moving Head]. The belt conveyor system is grasped at a moving rail during the moving operation, raised on one side, pulled laterally and finally lowered again in the end position. A certain amount of moving is achieved by a plurality of partial moving operations. The moving device covers the entire length of the belt conveyor system during each partial moving operation. The head and rail stations with belt drive and a traveling tripper that is possibly present are moved by another auxiliary device, for example, a transport caterpillar because of their own heavier weight. Fine alignment of the belt-supporting structures is necessary at the end of each moving operation. This solution shown has the advantage that the belt section is lightweight and the caterpillar tractor can again be used for other tasks after the moving of the belt. However, the multiple moving of the moving device to and fro causes an additional compaction of the subsoil, which may even be useful, as, for example, in open cast mining in case of freshly deposited surfaces, but this may be undesired in case of traveling on a dump on which ore has been freshly dumped.

Furthermore, a belt conveyor system is known, which is equipped with caterpillar-type moving gears (endless track moving treads) and can thus perform the moving operation itself. It comprises a plurality of individual bridges, which are connected to one another in an articulated manner and can be moved on their caterpillar-type moving gears at right angles to the direction of delivery (technical journal *Surface Mining*, 2001, No. 2, page 248, title: "Dynamic Pad Reclaim and Stacking System"). The conveyor belt is guided continuously from the beginning to the end of the segments. The drive is accommodated in the last segment and the tensioning station in the first segment. A traveling tripper is arranged on the bridges movably over the entire length of the conveyor. The bridges must therefore be made sufficiently stable and provided with a roadway for the traveling tripper. This conveyor has a very heavy weight of its own, which acts on the subsoil via the caterpillar-type moving gears of the segments and thus compacts same, which may be undesired in certain cases, for example, when a dump is piled up for a certain leaching process.

Due to their heavy weight, the above-described movable belt conveyor systems are very expensive in case of great lengths.

SUMMARY OF THE INVENTION

The basic object of the present invention is therefore to provide a movable belt conveyor system that itself has a low weight, with which the dump of a leach pad can be traveled on without the ore piled up being compacted to an extent that is disadvantageous for the application of a subsequent leach process, where the belt conveyor system can be used economically even in case of great lengths.

According to the invention, a movable belt conveyor system is provided for use as a tipping belt. An intermediate conveyor is arranged upstream of the movable belt conveyor system, arranged at right angles to the direction of conveying. A transfer carriage that can be displaced on a said 4-caterpillar-type moving arrangement is provided for transferring the material from the intermediate conveyor to the belt conveyor system. The movable belt conveyor system includes, in the direction of conveying, a plurality of segments arranged one after another in a row, comprising a tail segment, a head element and standard segments arranged in between. The tail segment comprises a supporting structure, which is connected to the supporting structure of the transfer carriage rigidly and torsionally rigidly. The caterpillar-type moving gear (endless track moving treads) of the transfer carriage is thus also the moving gear of the tail segment at the same time. The standard segments and the head segment comprising a supporting structure each and a one-caterpillar-type moving gear are arranged rigidly at right angles to the longitudinal axis of the supporting structure. The segments are connected to one another by bolts in an articulated manner. Each of the segments accommodating carrying rollers in the carrying run and in the empty belt run. The tail segment is arranged as the first segment in the direction of conveying at the beginning of the conveying path and is equipped with belt drives as well as with a driving drum. The head segment is arranged as the last segment at the end of the conveying path and is equipped with a deflecting drum. A common conveyor belt is led over all segments. A traveling tripper is provided that encloses the segments in a portal-like manner. The traveling tripper is provided for releasing the material from the conveyor belt. The traveling tripper is displaceable by a separate steerable 4-caterpillar-type moving gear. The common conveyor belt is led in the known manner as a loop over a transferring drum, which is also a driving drum at the same time, and which is in functional connection with drives via a deflecting drum, which is also a tensioning drum, and forms a tensioning device.

The movable belt conveyor system is composed of the three types of segments: A tail segment, a head segment and many standard segments. These segments comprise each a supporting structure, carrying roller stations and an endless track or caterpillar-type moving gear. The tail segment has a peculiarity: it is combined with the transfer carriage arranged upstream of it in terms of conveying. Both supporting structures are united in terms of design in one common supporting structure and are equipped with a common, steerable 4-caterpillar-type moving gear. The tail station moves with this moving gear, together with the transfer carriage, on a firm soil next to the leach pad in parallel to the adjacent outer edge. The segments are connected to one another in an articulated manner in order to make it possible to compensate possible relative movements in relation to one another. The standard segments as well as the head segment move on the leach pad or on the piled-up dump. To clear the difference in height between the tail station and the other first standard section located on the dump, which is growing in height layer by layer, it is possible to insert sections leading obliquely upward. Due to the fact that the main sections and the head station comprise only a simple caterpillar-type moving gear and a supporting structure with carrying rollers each, the construction is relatively lightweight; due to the low own weight, the piled-up dump is not compacted substantially by the fact that it is being traveled over during the moving operation. A continuous belt band is used for the movable belt conveyor system. Since the traveling tripper needed for this dumping system would cause a substantial local increase in the weight of the movable belt conveyor system as used, it is designed as a separate device and is equipped with a 4-caterpillar-type moving gear of its own with pivotable caterpillars. Since the tail segment is moving on the soil next to the leach pad during the moving operation, the belt drive with the driving drum for the belt band of the movable belt conveyor system is integrated within the tail segment. The increase in weight resulting herefrom is thus not introduced into the leach pad.

The moving of the belt conveyor system into the particular next position is brought about by simultaneous travel with all caterpillar-type moving gears. The caterpillars of the moving gears for the segments as well as for the transfer carriage are arranged exactly in the direction of moving. The caterpillars of the traveling tripper can be pivoted. During the movement of the traveling tripper in the direction of conveying of the movable belt conveyor system, they assume this position in the longitudinal direction of the belt band, but they can be pivoted into the direction of moving for moving the belt conveyor system. The direction of travel of these caterpillars does not need to be pivoted for this directly into the direction of moving; it is already sufficient if the caterpillars are pivoted obliquely into the direction of moving. However, to achieve a uniform moving operation, the velocity of feed of the traveling tripper must be greater than that of the caterpillars of the standard segments, because only one component of the movement leads in the direction of moving of the belt conveyor system. The moving operation takes place with the belt band slackened. After the moving of the entire belt conveyor system, minor corrections of the end position are still carried out, if necessary, due to possible deviations that have developed in the positions of individual segments. Due to the transfer carriage being connected to the tail segment, to the use of a common caterpillar-type moving gear for this, the accommodation of a first belt drive in the tail segment, due to the traveling tripper being designed as an independent device, due to the accommodation of a second belt drive and the belt-tensioning means in the traveling tripper on caterpillars, and due to traveling on the soil next to the leach pad with the common caterpillar-type moving gear of the transfer carriage and of the tail segment, low surface pressure of the belt conveyor system on the dump is achieved. The lightweight design of the standard segments and of the head segment makes possible the use of lightweight driven caterpillar-type moving gears.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
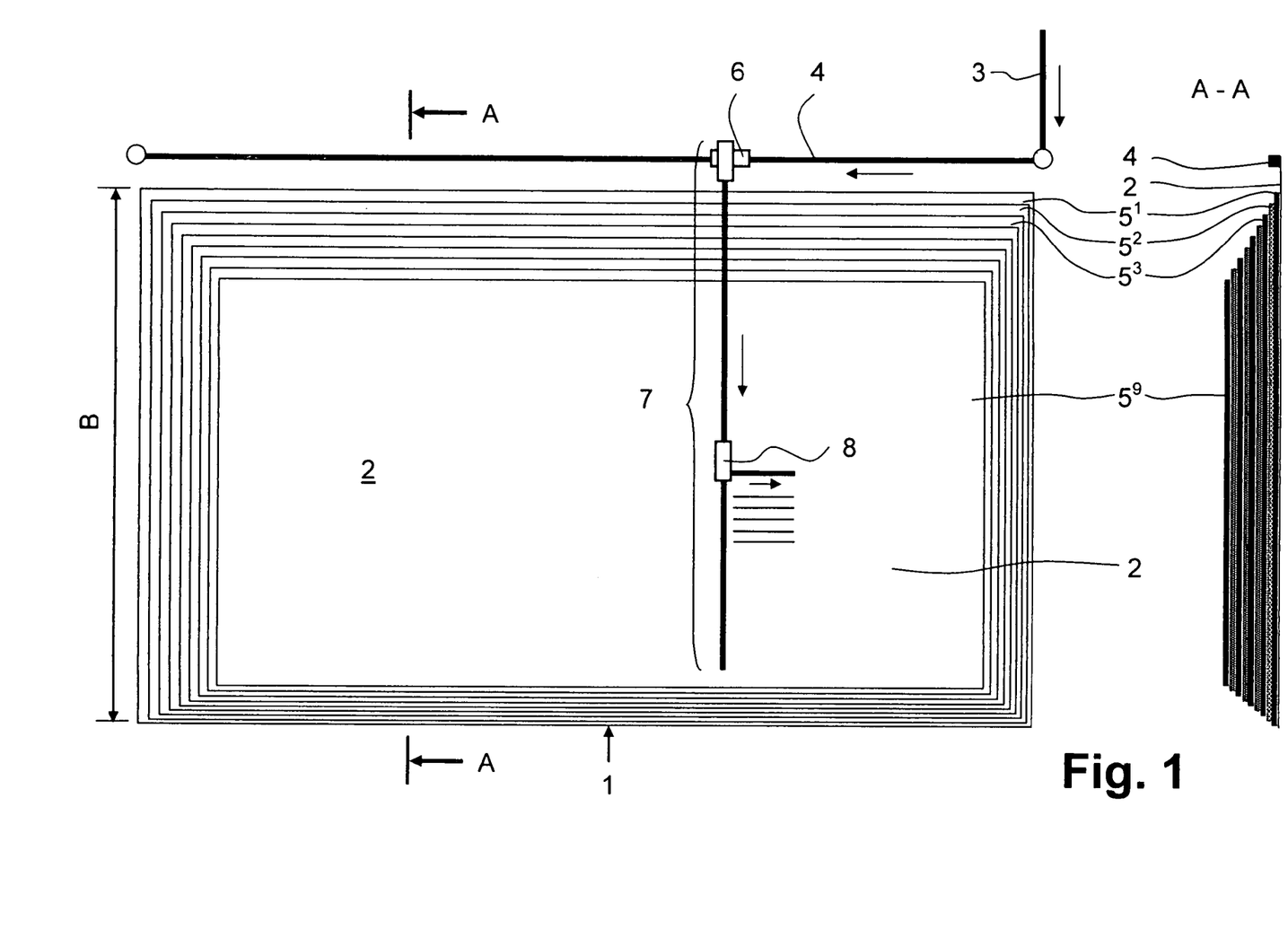
FIG. 1 is a top view of the entire leach pad with the belt conveyor systems used.
Figure 2:
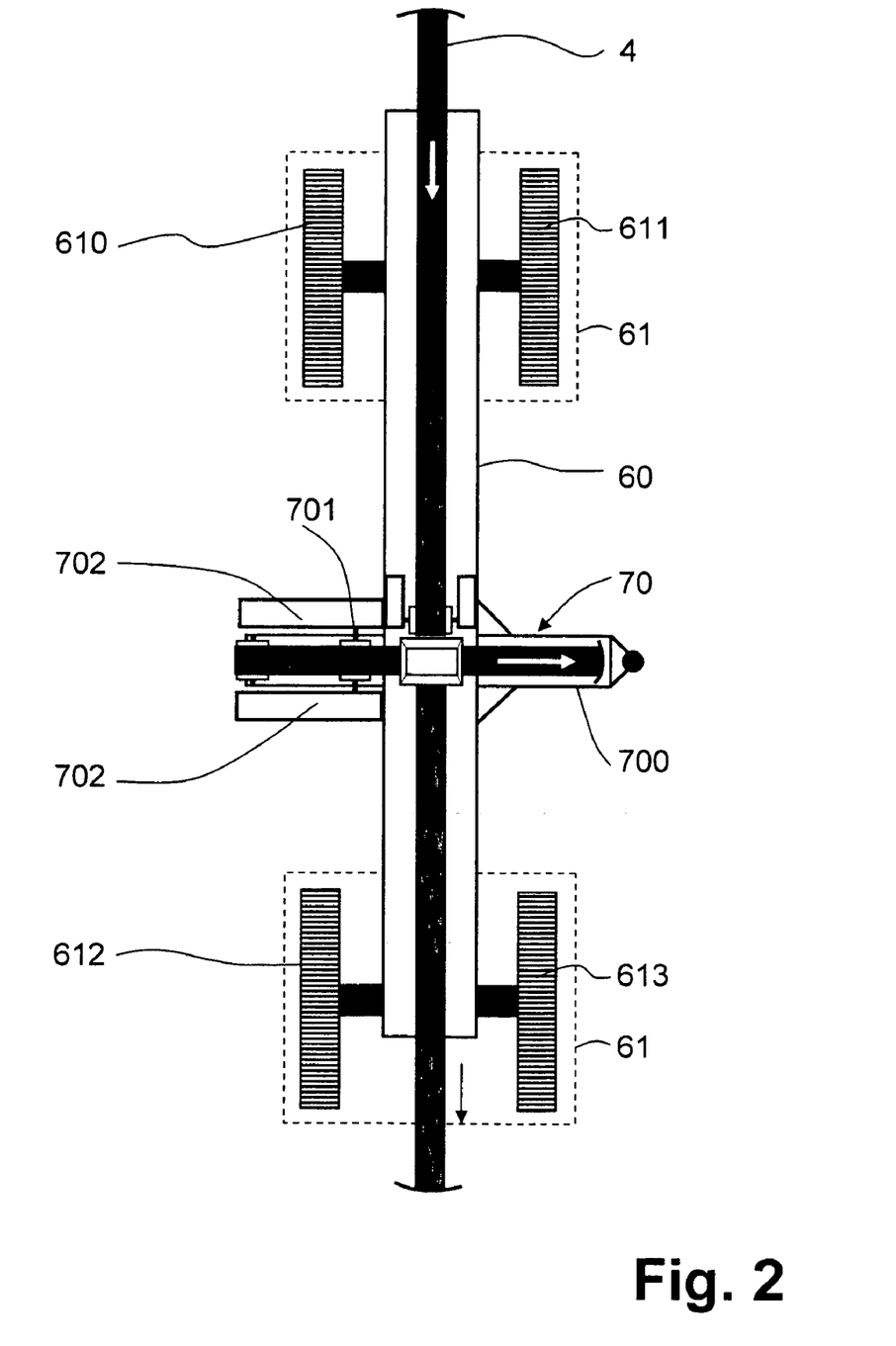
FIG. 2 is a schematic top view of the transfer carriage arranged above the intermediate conveyor with the tail segment.
Figure 3:
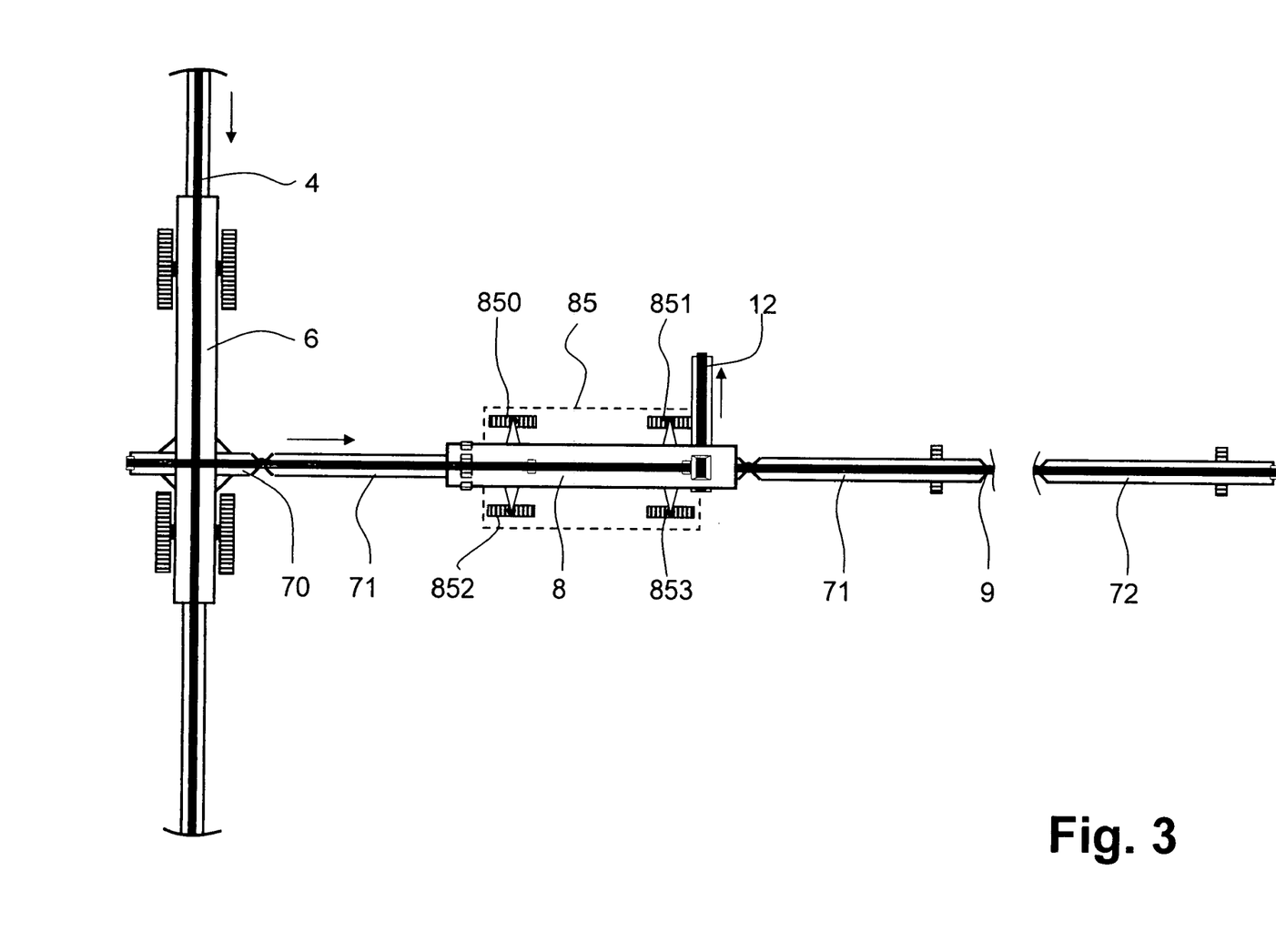
FIG. 3 is a schematic top view of the second intermediate conveyor and the movable belt conveyor system.

Referring to the drawings in particular, the leach pad 1 shown in FIG. 1 is intended for extracting ore according to the microbiological ore leaching process. The copper ore is piled up in a plurality of layers $5^{1-n}$ in a width B of one thousand meters and more to form a dump 2. The drawing shows nine layers $5^{1-9}$. The copper ore is fed to the leach pad 1 by a first intermediate conveyor 3 and a second intermediate conveyor 4 following the former. This second intermediate conveyor 4 is stationary and extends in parallel to the longitudinal side of the leach pad 1 shown at the top in the drawing. The directions of conveying of these conveyors and of the conveyors following these are indicated by arrows. The intermediate conveyor 4 is equipped with a transfer carriage 6 according to FIG. 2. The transfer carriage 6 is displaceable by means of a caterpillar-type moving gear 61, which is arranged under the supporting structure 60 and comprises four steerable individual caterpillars 611, 612, 613, 614. According to FIG. 3, the movable belt conveyor system 7 is arranged downstream of the transfer carriage 6. It has the function of a tipping belt. Its direction of conveying is at right angles to the intermediate conveyor 4 in the top view. It comprises a plurality of segments arranged in a row, wherein the first segment arranged in the direction of conveying is the tail segment 70 and the last segment is the head segment 72; the number of standard segments $71^{1-n}$ arranged between them corresponds to that needed for the projected width B of the leach pad 1. The tail segment 70 forms a design unit with the transfer carriage 6. This pertains to both the carrying structure, comprising the supporting structures 60 and 700, and the moving gear 61. The construction of the supporting structure 60 of the transfer carriage 6 is continued directly as a construction of the supporting structure 700 of the tail segment 70. The tail segment 70 also accommodates the carrying roller stations as well as the driving drum 701 with the drives 702 for the conveying belt 9. The carrying rollers 10 for the carrying run and the carrying rollers 11 for the carrying run are arranged in the same manner as in the case of the standard segment 71 according to FIG. 6. Since the additional components, which are also heavy at the same time, such as the drives 702 and the belt drum 701, are displaced next to the leach pad 1 during the moving of the belt, they do not contribute to the compaction of the ore piled up to form a dump 2.

Figures 4, 5:
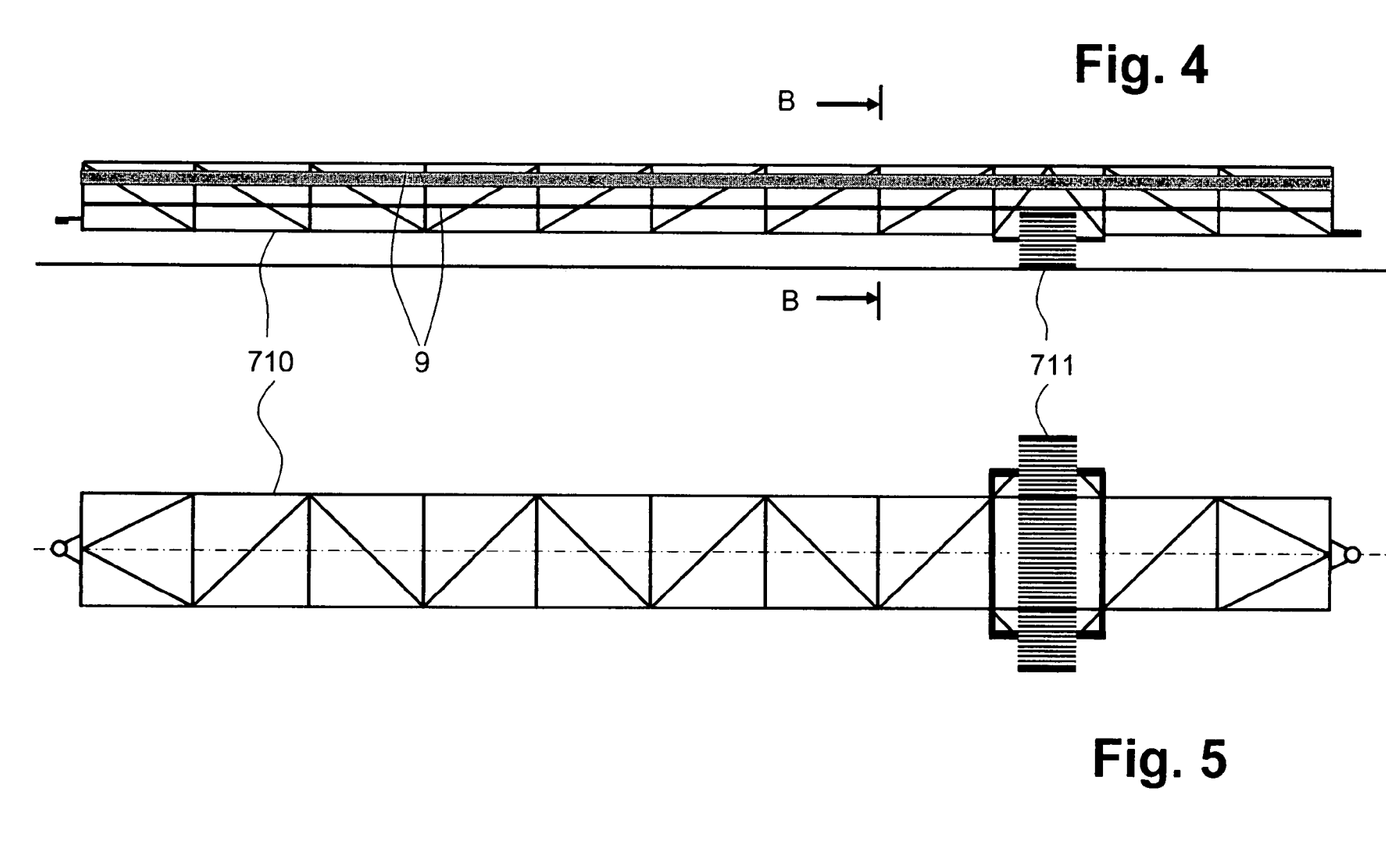
FIG. 4 is a side view of a standard segment.
FIG. 5 is a top view of the standard segment according to FIG. 4.
Figure 6:
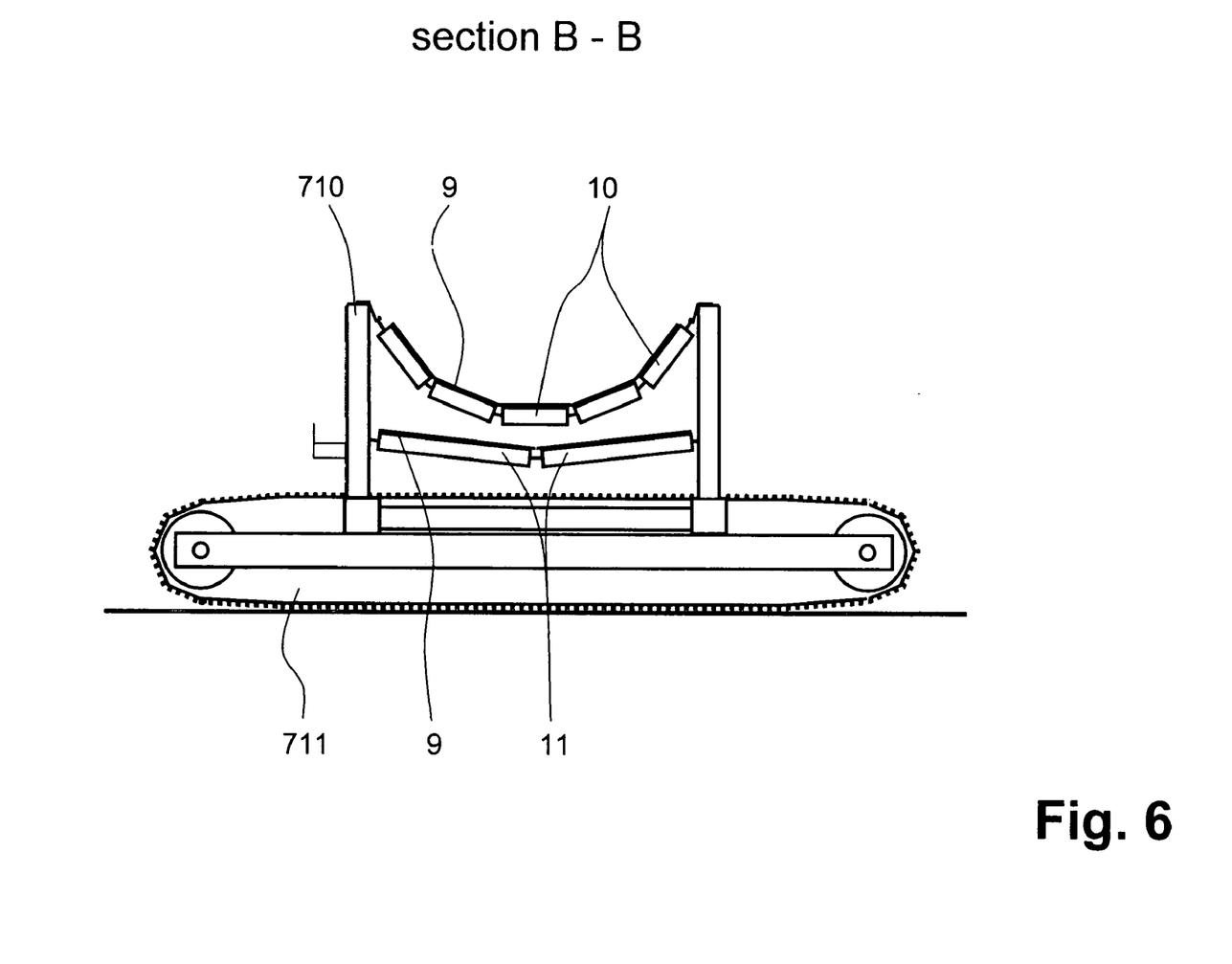
FIG. 6 is sectional view B—B according to FIG. 4.
Figure 7:
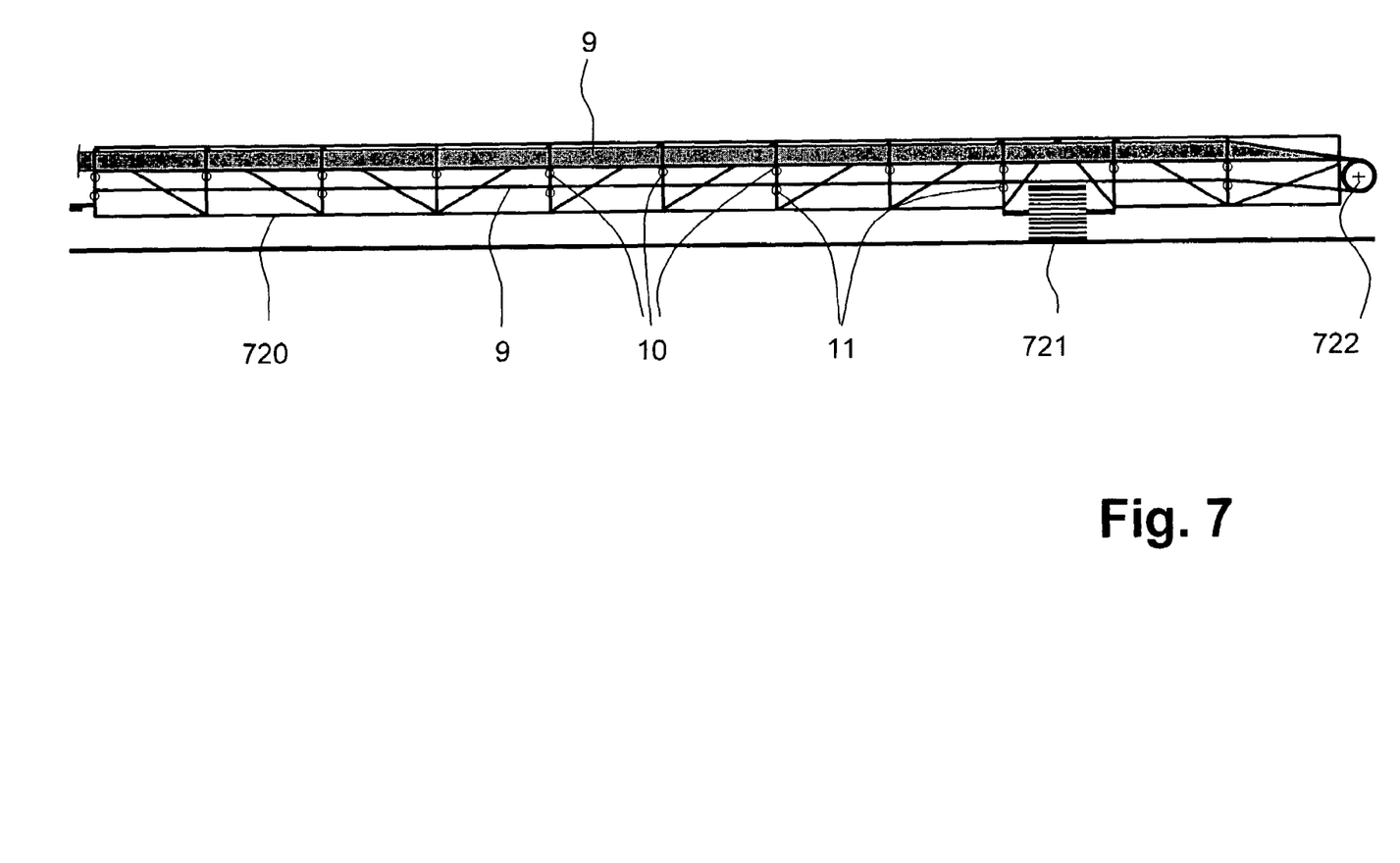
FIG. 7 is a side view of a head segment.

Each of the standard segments $71^{1-n}$ comprises, according to FIGS. 4 through 6, a supporting structure 710 and a caterpillar-type moving gear 711. The caterpillar-type moving gear 711 is a driven caterpillar, which is arranged rigidly in the direction of moving on one side of the standard segments $71^{1-n}$. On the other side, the standard segment $71^{q-n}$ is connected to the next standard segment $71^{2-n}$ by bolts in an articulated manner. This articulated connection is necessary to make it possible to compensate relative movements occurring during the moving operation. FIG. 7 shows the end piece of a movable belt conveyor system, the head segment 72. This head segment 72 is equipped, essentially as a main segment 71, with a structure 720 and with a caterpillar-type moving gear 721. In addition to this, a deflecting drum 722 is arranged at the head segment 72.

Figure 8:
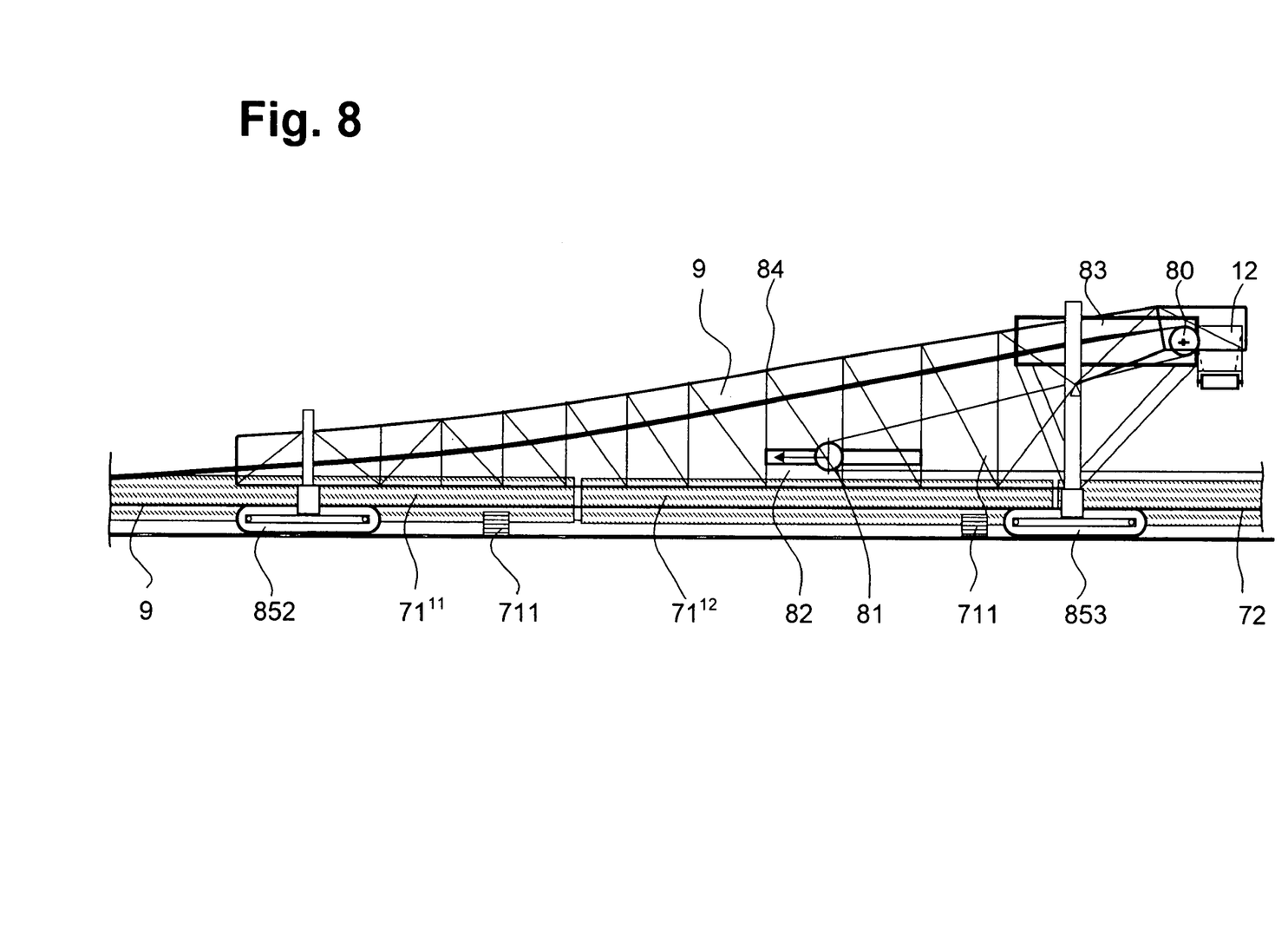
FIG. 8 is a side view of the traveling tripper on steerable caterpillars (endless track moving treads).

A traveling tripper 8 is provided according to FIG. 8 for releasing the material uniformly from the movable belt conveyor system onto the leach pad. It is designed as an independent device, so that the loads of the dump 2 do not add up locally when being traveled over by the segments $71^{1-n}$, 72 with the traveling tripper 8. The conveyor belt 9 is led as a loop in the known manner over the driving drum 80, which is also the discharging drum at the same time, and the deflecting drum 81, which is also the tensioning drum. The deflecting drum 81, which is also the tensioning drum at the same time, and the tensioning drum 82 form together the tensioning station. The driving drum 80, which is also the discharging drum at the same time, is in functional connection with a drive 83. If necessary, a second drive may also be provided next to the one drive 83. The guiding of the belt is modified now to integrate another, additional driving drum belonging to it. In the flight parabola of the ore being discharged, the structure 84 accommodates a tipping bridge 12, from which the bulk material is discharged onto the dump 2. The parallel side walls of the structure 84 of the traveling tripper 8 have such a great distance from one another that the segments $71^{1-n}$, 72 can be accommodated between them. The segments shown schematically in the drawings are the standard segments $71^{11}$ and $71^{12}$ and the head segment 72. The traveling tripper 8 is equipped with a steerable caterpillar-type moving gear 85, comprising four caterpillars 850, 851, 852, 853 of identical design, and it can be displaced by means of these separately both in the longitudinal direction of the segments $71^{1-n}$, 72 and in the direction of moving as well as in all positions located in between on the flat surface of the deposited dump 2. The distance between the two caterpillars 850 and 852 as well as 851 and 853 of one pair of caterpillars must be selected to be so broad that the traveling tripper 8 will not collide with the caterpillar-type moving gears 711 and 721 of the standard segments 71 and of the head segment 72 during the moving of the belt conveyor system, which will be described below, with the caterpillar-type moving gear 85 pivoted in.

The conveyor belt 9 is guided over the entire movable belt conveyor system 7 and the traveling tripper by the carrying rollers 10, 11 in the carrying run and in the empty belt. The drives 702 and 83 for the material to be conveyed are accommodated in the tail segment 70 and in the traveling tripper 8. The belt-tensioning station is arranged in the traveling tripper 8.

The movable belt conveyor system 7 for piling up a dump 2 for a leach pad 1 operates as follows:

The movable belt conveyor system 7 is in a starting position at the beginning of the surface of the leach pad 1. It extends over the entire width B of the leach pad 1. All segments 70, $71^{1-n}$, 72 and the traveling tripper 8 are aligned in a row. The ore is fed via the intermediate conveyors 3, 4 and transferred via the transfer carriage 6 onto the conveyor belt 9 of the movable belt conveyor system 7. It is dumped therefrom by the traveling tripper 8 and the tipping bridge 12 onto the surface prepared for the leach pad 1. When the projected dumping height has been reached, the traveling tripper 8 moves backward on its caterpillar-type moving gear 84 by a certain amount against the direction of conveying of the belt conveyor system 7. This process is repeated until the first row is filled up completely. The belt band 9 is then slackened and the belt conveyor system 7 is moved farther on the leach pad 1 by the amount of moving. The caterpillar-type moving gear 84 of the traveling tripper 8 is first pivoted into the direction of moving for this. This does not need to take place directly in the direction of moving, but it may also take place obliquely in relation thereto. The drives of the caterpillar-type moving gears 61, 711, 721, 84 of the transfer carriage 6 and at the same time of the tail segment 70, of the standard segments $71^{1-n}$, of the head segment 72 and of the traveling tripper 8 are then put into operation at the same time. After the amount of moving has been reached, the drives of the caterpillar-type moving gears are switched off. This is still followed, if necessary, by fine corrections of the positions of individual devices of the movable belt conveyor system, such as the tail segment 70 with the transfer carriage 6, the standard segments $71^{1-n}$, the head segment 72, and the traveling tripper 8. The conveying belt 9 is subsequently tensioned again and the caterpillars 840, 841, 842, 843 of the traveling tripper 9 are again positioned into the longitudinal direction of the belt conveyor system 7. The next row of ore is now piled up next to the first row in this new position. These cycles are repeated until a layer $5^1$ of the entire leach pad 1 is filled up completely with ore. A second layer $5^2$ of ore is then started to be filled up on the dump 2.

Since the height of the dump 2 progressively increases with increasing dumping, but the level of the roadway for the tail segment 70 on both sides of the intermediate conveyor 4 remains the same, one or more segments with compensating radii, which are coordinated with the difference in height, can be used to clear this difference in height between the roadway of the transfer carriage 6 with the tail segment 70 and the surface of the dump 2.

The lightweight design of the standard segments $71^{1-n}$ and of the head segment 72, which has become possible especially due to the exclusion of the belt drive 702 and the belt-tensioning device and the separation of the traveling tripper 8 from the segments $71^{1-n}$, 72, makes possible a weight-saving lightweight construction of the main segments $71^{1-n}$ and of the head segment 72 with the use of small caterpillar-type moving gears, which are manufactured by mass production and consequently at a favorable cost.

While a specific embodiment of the invention has been shown and described in detail to illustrate the application of the principles of the invention, it will be understood that the invention may be embodied otherwise without departing from such principles.

What is claimed is:

1. A movable belt conveyor system intended for use as a tipping belt, the system comprising:

an intermediate conveyor;

a movable belt conveyor system having a direction of conveying, said intermediate conveyor being arranged upstream of said movable belt conveyor system at right angles to the direction of conveying, said movable belt conveyor system including, in the direction of conveying, a plurality of segments arranged one after another in a row, comprising a tail segment, a head element and standard segments arranged in between said tail segment and said head element;

a transfer carriage displaceable on a 4-caterpillar-type moving gear for transferring the material from the intermediate conveyor to the belt conveyor system, said tail segment comprising a supporting structure connected to a supporting structure of said transfer carriage rigidly and torsionally rigidly, said caterpillar-type moving gear of said transfer carriage thus also forming a moving gear of said tail segment, said standard segments and said head segment each comprising a supporting structure and a one-caterpillar-type moving gear arranged rigidly at right angles to the longitudinal axis of the supporting structure, said tail segment, said standard segments and said head segment being connected to one another by bolts in an articulated manner, and each of said tail segment, said standard segments and said head segment accommodating carrying rollers in a carrying run and an empty belt, said tail segment being arranged as the first segment in the direction of conveying at the beginning of the conveying path and being equipped with belt drives as well as with a driving drum, said head segment being arranged as a last segment at the end of the conveying path and being equipped with a deflecting drum, a common conveyor belt being led over all of said tail segment, said standard segments and said head segment segments; and a traveling tripper which encloses said tail segment, said standard segments and said head segment in a portal-like manner, said tripper being provided for releasing material from said common conveyor belt, the traveling tripper being displaceable by a separate steerable 4-caterpillar-type moving gear and said common conveyor belt being led in a known manner as a loop over a transferring drum, which is also a driving drum at the same time, and which is in functional connection with drives and via a deflecting drum, which is also a tensioning drum, and forming a tensioning device.

2. A movable belt conveyor system in accordance with claim 1, wherein standard moving gears are provided as caterpillar-type moving gears for said standard segments and said head segment.

3. A movable belt conveyor system in accordance with claim 1, wherein one or more drum drive are provided as said belt drives in the tail segment.

4. A movable belt conveyor system in accordance with claim 1, wherein the minimum passage between two said caterpillars each of a pair of caterpillars of said traveling tripper is greater in each of the pivoting devices provided for moving than a diagonal longitudinal extension existing with the caterpillar-type moving gears of the standard segments and of the head segment.

5. A movable belt conveyor system comprising:

an intermediate conveyor;

a movable belt conveyor system having a direction of conveying, said intermediate conveyor being arranged upstream of said movable belt conveyor system at right angles to the direction of conveying, said movable belt conveyor system including, in the direction of conveying, a plurality of segments arranged one after another in a row, comprising a tail segment, a head element and standard segments arranged in between said tail segment and said head element, said standard segments and said head segment each comprising a supporting structure, said tail segment, said standard segments and said head segment being connected to one another in an articulated manner, and each of said tail segment, said standard segments and said head segment accommodating carrying rollers in a carrying run and an empty belt run, said tail segment being arranged as the first segment in the direction of conveying at the beginning of the conveying path and being equipped with belt drives as well as with a driving drum, said head segment being arranged as a last segment at the end of the conveying path and being equipped with a deflecting drum, a common conveyor belt being led over all of said tail segment, said standard segments and said head segment segments;

a transfer carriage displacable on endless track moving treads for transferring the material from the intermediate conveyor to the belt conveyor system, said tail segment comprising a supporting structure connected to a supporting structure of said transfer carriage rigidly and torsionally rigidly, said transfer carriage endless track moving treads also forming a moving means for moving said tail segment; and a traveling tripper displaceable by endless track moving treads along said segments laterally at each side of said segments, said traveling tripper being provided for releasing material from said common conveyor belt with said common conveyor belt being led as a loop over a transferring drum, which is also a driving drum at the same time, and a deflecting drum, which is also a tensioning drum, and forms a tensioning device.

6. A movable belt conveyor system in accordance with claim 5, wherein said standard segments and said head segment each have an endless track moving tread connected rigidly at right angles to the longitudinal axis of the supporting structure.

7. A movable belt conveyor system in accordance with claim 5, wherein one or more drum drive are provided as said belt drives accommodated in said tail segment and at least partially supported by said transfer carriage.

8. A movable belt conveyor system in accordance with claim 5, wherein the minimum passage between two endless track moving treads of said traveling tripper is greater in each of the pivoting devices provided for moving than a diagonal longitudinal extension existing with the endless track moving treads of the standard segments and of the head segment.

* * * * *